Aug. 26, 1958
V. DALL'OLIO
2,848,883
CONTROLLED TORQUE COUPLING FOR CONVEYING ROTARY MOTION
Filed June 19, 1956
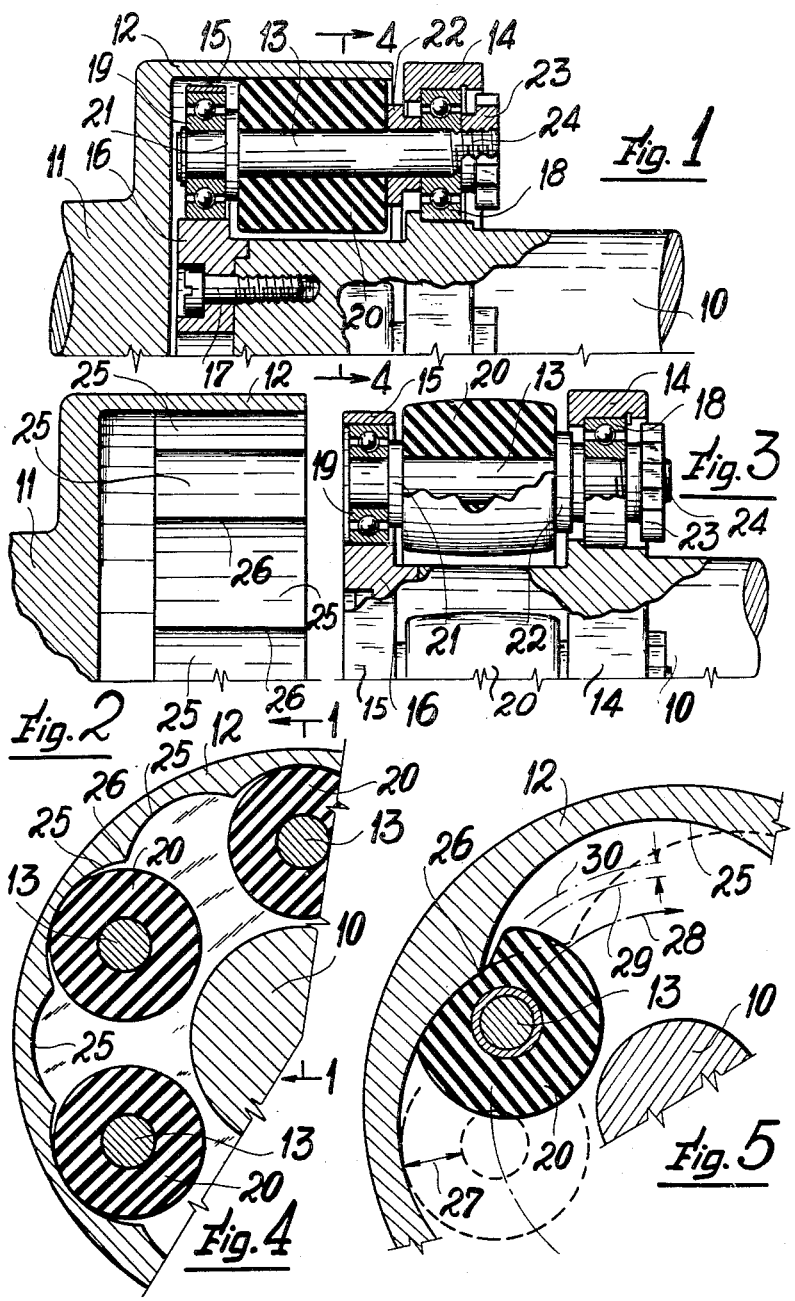
INVENTOR.
Vittorio Dall'olio
BY: Michael S. Striker
Agt.

United States Patent Office 2,848,883
Patented Aug. 26, 1958

2,848,883

CONTROLLED TORQUE COUPLING FOR CONVEYING ROTARY MOTION

Vittorio Dall'Olio, Legnano, Italy

Application June 19, 1956, Serial No. 592,387

Claims priority, application Italy June 23, 1955

6 Claims. (Cl. 64—29)

This invention relates to a controlled torque coupling for conveying rotary motion adapted to be applied to rotary shafts or mechanisms, and for establishing a driving engagement between separate rotary parts.

This invention relates more particularly to a new and advantageous coupling means designed for driving engagement of a rotary power means, say a motor or other source of rotary motion, with a rotary driven means, say a mechanism, a machine tool and the like, the said coupling means being designed for transmission of rotary motion within a defined torque, so that the transmission itself, and/or the motor, and/or the driven mechanism may be protected against the stresses which may occur if the power applied and/or the load of the driven mechanism exceed a predetermined torsional value or torque.

It is known to those skilled in the art to which this invention appertains that a great number of coupling means or devices has been devised and constructed for having the transmission effected, i. e. the rotary motion conveyed until the transmitted torque reaches a predetermined limit. A number of such devices consists in plain safety couplings, wherein a member designed to break at a predetermined torque is used, and another number of such devices includes couplings of the so called "friction type," wherein two or more friction members are employed in a frictional relationship adapted to transmit a predetermined maximum torque and designed to slide one along the other or others as said maximum is exceeded.

It is further known that such friction type coupling means are subject to several and serious objections. For example, said coupling means hardly endure a protracted sliding condition of operation, e. g. if the excessive torque is applied for a rather long time. In such occurrence, the friction members comprised in the device are subject to severe abuse, heat and wear. In general, few seconds of sliding relationship of the said friction coupling members may seriously damage the device. Further, it is very difficult to set said friction coupling means for discontinuing the transmission of power at a closely defined maximum torque, and any setting of the device is in general affected by a plurality of causes, e. g. by any variation of lubrication, if any, of moisture, of external heat, by the presence of dust, by the smoothness of the surface taking part in friction engagement, and so on.

The principal object of this invention is to provide a new and advantageous controlled torque coupling device which is not subject to the above and other faults of the known devices, and which may ensure the torsional transmission of the motion up to a very closely defined maximum torque applied to the rotary parts, and which makes sure that no torque greater that the said well defined torque will be transmitted.

Another object of this invention is to provide a new and advantageous controlled torque coupling device through which the transmission of rotary motion, within the limits of a predetermined torsional value, is protected against shocks and temporary stresses, i. e. this invention provides a controlled torque device which may advantageously be made use of as an effective shock absorber.

A further object of this invention is to provide a new and advantageous controlled torque coupling means which may be readily controlled by an operator for setting the device for a predetermined torque and for varying said predetermined torque, if desired.

A still further object of this invention is to provide a new and advantageous controlled torque coupling means which is exceedingly simple in construction and safe in operation.

A still further object of this invention is to provide a new controlled torque coupling means wherein torque-responsive members cheap in manufacture and well adapted for substitution or replacement are included.

An other object of this invention is to provide a new and advantageous controlled torque coupling device of the character described, wherein frictionally operating members are not included, and wherein the various cooperating members may be arranged in a grease or other lubricant proof casing, for having such members operating in a properly lubrified condition and wherein such condition of lubrication and the variations thereof, e. g. due to the type and/or to the temperature of the lubricant, cannot influence the value of the maximum torque at which the device is set to operate.

Generally speaking, the objects of this invention are attained by the provision of a first rotary part including a plurality of resiliently compressible idler rollers supported in a structure and rotatable, respectively, about a plurality of axes evenly spaced about the main axis of the device, and of a second rotary part including a surface arranged to contact said idler rollers and shaped to cause said rollers to be resiliently compressed as a relative rotary motion occurs between said first and second rotary parts, while the said idler rollers roll without sliding motion along said shaped surface.

More particularly, embodiments of this invention include the following features:

The rotation of said plurality of idler rollers is achieved by rotatably supporting same, respectively, by a corresponding plurality of pivot means secured in a hub forming part of one of said rotary parts, say of said first rotary parts.

Each one of said idler rollers is constructed as a brief shaft rotatably supported, preferably by means of suitable bearings, e. g. by ball bearings, in the said hub, each one of said rollers being provided with an outer resiliently compressible tubular member made of rubber or of rubber-like material, surrounding said rotatable brief shaft.

In the structure referred to above nuts or like means are arranged at one end of said brief shaft and designed for axial abutment against the respective compressible tubular member, so that variations of the resistance of the rubbery material to radial compression of said member may be attained by modifying the status of axial compression thereof.

The said surface designed to cooperate with the said resiliently compressible rollers in an improved manner includes the provision of a plurality of curved hollow portions, each one of which defines a curved surface of a radius smaller than the radius of the path of the outer portion of the said rollers, as the latter rotate together with the rotary part supporting same, so that as one of said rotary parts is urged to rotate relatively to the other one the said rollers are caused to be radially compressed.

The curved surface of any one of said curved hollow portions is circumferentially limited so that the said compressible rollers may rollingly travel along each one of said portions and then pass into the adjacent one, after having been subject to a predetermined permissible radial compression. In the case that the coupling means should be intended to be operated as a plain torsional shock-absorber only, said curved hollow portions may be extended circumferentially for preventing the said passage of the rollers out of the hollow portions in which the same are set into the next following ones.

The novel features of this invention are in particular set forth in the appended claims. The above and other objects of this invention and the invention itself, however, will be apparent to those skilled in the art to which this invention appertains from the disclosure of this application and as set forth in the specification thereof and illustrated in the accompanying drawings, forming an essential component of this specification, and wherein:

Fig. 1 illustrates in vertical sectional view, taken along the line 1—1 of Fig. 4, a preferred but not exclusive form of embodiment of this invention, as applied for conveying rotary motion between two rotary shafts. In said Fig. 1, the device is shown but in its upper half portion, the lower half part of same being intended to be symmetrically alike;

Figs. 2 and 3 likewise illustrate separately the two rotary parts of the device of Fig. 1. In Fig. 3, a few of the members of the rotary part are shown in side elevation;

Fig. 4 illustrates in vertical cross-sectional view, taken along the line 4—4 of Fig. 1, the said form of embodiment of this invention, and Fig. 5 is a fragmentary vertical cross-sectional view, similar to that of Fig. 4, showing a somewhat simplified form of the embodiment shown in Fig. 4, for the purpose of clear understanding of the operation of the coupling means according to this invention.

Like reference numerals refer to like parts throughout the several figures of the accompanying drawings. In the said drawings of this specification and in the specification itself, however, some minor details and the particulars of the connecting means designed to connect the device of the invention to the driving and to the driven mechanisms are omitted, such details and particulars, easily conceivable by those skilled in the art, being not included within the subject matter of the invention.

Referring now to the drawings: in the embodiment shown in Figs. 1 to 3, the coupling device according to the invention is designed for conveying rotary motion between two shafts 10 and 11, each one of which may be either the driven one or the driving one. At its end portion operatively connected to the device according to the invention, the said shaft 11 is formed integral with a cup-shaped member 12 having an inner shaped surface which will be further described in detail. Of course, said cup shaped member may also be a separate unit and keyed to said shaft, or otherwise connected or secured to the driving or to the driven rotary part.

Surrounding the opposite end portion of the other shaft 10 a plurality of brief shafts 13 is arranged. The axes of said shafts 13 are parallel to and evenly spaced at like radial distances from the axis of shafts 10 and 11. Each one of said shafts 13 is rotatably supported in a hub structure formed integral with or secured to the said end portion of shaft 10. In the embodiment shown, said hub structure comprises a flange portion 14 of said shaft 10 and a second flange or disk-like member 15 having a central portion 16 secured to the end portion of said shaft 10, by means of bolts 17, for example (Fig. 1). Said flange portion 14 and member 15 are arranged for rotatably supporting each one of said brief shafts 13 at the ends thereof, respectively, by means of ball-bearings 18 and respectively 19, for example, to enable said shafts to rotate freely.

Mounted around any one of said brief shafts 13 is a tubular member 20 made of resiliently compressible material. Said members 20 may be constructed of natural rubber or of synthetic rubber, according to the various requirements to be met in the application and in the operation of the coupling device, e. g. depending upon whether such device is supported to be operated in lubricated condition or not.

In operation, the said tubular rubbery members 20 act as the torque-responsive elements of the device, and the response of the device to a predetermined torque is a function of the radial compression load applied to said members. Therefore, the setting according to the coupling device of the invention is a function of the resistance of the said members 20 to radial compression.

It is an important feature of the invention that the coupling device comprises means controlled by an operator and designed for modifying the said resistance, i. e. the range of torque at which the said device is intended to transmit rotary power. Such means includes the arrangement of said members abutting at one end, against a flange portion 21 made integral with the respective shaft 13 and, at the opposite end, against annular flange member 22, axially movable along said shaft 13 between the said member 20 and the ball-bearing 18, and the provision of a nut 23 screwed on the threaded end portion 24 of the said shaft 13.

By tightening the said nut 23 along said portion 24 an axial compression may be caused of said rubbery member 20. In Fig. 3 the said member is shown as being subjected to a certain axial compression. It is known to those skilled in the art that an axial compression of a rubbery nearly cylindrical member, such as any member 20 of the described device, causes a radial expansion of same, and increases its resistance to radial compression.

The assembly comprising the said end portion of shaft 10, the plurality of the idler rollers including said resilient members 20 together with the shafts 13 by which the latter are supported and set, and the supporting elements of said shafts 13 is rotated as a whole by said shaft 10 about the axis of latter. Said assembly is arranged, for operation, inside the said cup-shaped end portion 12 of the other shaft 11, in a relative arrangement and in an operative relationship which will be readily understood by reference to the accompanying drawings.

The said cup-shaped portion 12 includes an inner surface provided with a plurality of curved hollow portions 25 (Figs. 2, 4 and 5) evenly spaced along the circumference of said portion 12 for having each one of said idler rollers accommodated by one of said hollows. The shape and the location of said hollows 25 are designed for having the said members 20 not compressed or only slightly compressed as the surface of said members 20 contacts the inner surface of said hollows 25 at the deepest points thereof, as shown in Figs. 1 and 4 and, in dashed lines, in Fig. 5. Adjacent hollows 25 have common boundaries along the ridges 26, which may be passed over by said idler rollers in case a radial compression of the resilient member 20 of the said idler roller is caused by the torque applied, as shown in Fig. 5.

The operation of the described device may be best understood by a consideration of Fig. 5. Let us assume that a rotative power is applied to shaft 10, while a torsional resistance is applied to the said cup-shaped portion 12. Said assembly including the shafts 13 is caused to rotate while located within said member 12 in the direction of the arrow 28, for example. The axes of the various idler rollers (but one of which is shown in Fig. 5) travel along the circular path shown in Fig. 5 by the dot-and-dash arc ending in the said arrow 28. Let us further assume that the resilient portion of said idler rollers consists in a tubular rubbery member 20 having a wall thickness as indicated by 27, which is greater than the depth of each hollow 25, with respect to the circular line 30 passing through said ridges 26. The circular line 29 indicates the path of the outermost rigid elements of the rotating assembly.

From the above and the accompanying drawings it will be readily understood that any rotation of shaft 10 with respect to said cup-shaped member 12, tending to move the idler rollers from a position at which they contact the surface of hollows 25 at the deepest points thereof towards said ridges 26 will cause the said resilient members 20 to be radially compressed, and therefore said rotation will meet a resistance which is a function of the resistance of said members 20 to radial compression.

Such resistance will increase until said idler rollers pass over a ridge 26 encountered. In Fig. 5 the device is shown in the condition in which it resists the highest torque for which it has been set. If the torsional resistance of the driven part exceeds such highest transmittable torque, the said driving shaft 10 is allowed to rotate with respect to said driven cup-shaped member 12 while the members 20 roll along the hollows 25 and pass over the ridges 26. Obviously, the device may also be operated by applying the rotative power to said cup-shaped member 12 and setting up the torsional resistance in the assembly connected to shaft 10.

If the use of the device as a plain torsional shock-absorber is desired, i. e. if the device is intended to resist to any torque within the limits of its construction, the said hollow portions 25 of the inner surface of cup-shaped member 12 may be constructed with ridges 26 which are nearer to the axis of shafts 10 and 11 than the outermost rigid elements of the said assembly. For example, the said ridges 26 may be located inside the circle indicated by said circular line 29 of Fig. 5, so as to prevent said idler rollers to pass over said ridges 26.

It will be therefore understood that I have devised a new and advantageous device adapted to transmit rotary motions within the limits of a predetermined torque, and that in the device according to the invention the said limits are defined by the compression of resilient members, and not by frictional interaction of parts.

It will be further understood that in the device constructed according to the invention the relative movements of the various parts, when the device is subject to a torque greater than the torque which it has been set to transmit, do not cause frictional or sliding relative movements of members, but only a mere rolling action of the said idler rollers on the inner surface of the said cup-shaped member 12, and a repeated radial compression of the resilient members 20 of said idler rollers. A great number of devices constructed as shown has been tested and found satisfactory under the most severe conditions and for very long time of fast rotation of one rotary part with respect to the other one.

It will be understood also that, due to the described employment of operative elements which do not operate with frictional interaction, varying conditions of heat and of lubrication will not affect the setting of the maximum torque to which the device is to respond, provided that the resiliency of the members 20 is not affected by said factors. By constructing the said resilient members 20 of a suitable known grease-resisting synthetic rubbery material, the whole device may be operated inside a casing and in properly lubricated conditions. For example, the same cup-shaped member 12 may be shaped and connected to other casing members for constituting an enclosure, rotatable with respect to shaft 10, and wherein all parts of the said assembly including the idler rollers may be protected during operation.

Further, the device according to the invention may be readily constructed and operated, by applying current knowledge of the art, as a part of a mechanism. For example, the said cup-shaped member 12 or the said assembly comprising the idler rollers may be made integral with or directly secured to the output shaft of a motor or to other power take-off means, or to a flywheel, or to the input shaft, pulley or wheel of the driven machine or mechanism. The incorporation of devices according to the invention into the hub portion of rotary tools of cultivators or other agricultural machine-tool has been tested with very satisfying results.

In the embodiment of the invention shown, the device includes a plurality of resiliently compressible idler rollers rotatably supported about axes parallel to the axis of the shafts or rotary parts coupled by the device. Other arrangements may be also devised, for example the said axes of the brief shafts 13 may be arranged evenly spaced on a frusto-conical surface. In such construction the adjustment to a torque at which the device is desired to resist and convey may be done by axially moving the said assembly including the idler rollers (which will be constructed in a frusto-conical shape also) with respect to a cup-shaped member including a generally frusto-conical inner surface.

Further, the device according to the invention may be designed for meeting various requirements in respect to the angular amplitude of the relative motion of the rotary parts, from the position of zero torque conveyed to the position of maximum torque. For example, in the embodiment shown in Fig. 4, a small angular motion of the assembly comprising the idler roller will cause the said rollers to pass the ridges 26 between the adjacent hollows 25. In this embodiment, the number of the said hollows 25 is twice the number of the idler rollers. On the contrary, in the simplified embodiment of Fig. 5, the angular interval between the various ridges 26 is greater, and in each hollow 25 an idler roller may be located and operated. In this embodiment, the relative angular motion of the two rotary parts, within the limits of the conveyable torque, correspond to the angular spacing between the two positions of the idler roller, one drawn in dashed lines and one in full lines. In this embodiment, the device according to the invention operates as a very "soft" angular shock-absorber while subject to variations of torque, within the limits of the conveyable torque, i. e. when the idler rollers are not caused to pass over the ridges 26.

In consideration of the above, without further analysis the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalents of the invention itself, as defined in and by the following claims.

Having thus described the invention and the mode of operation thereof, I claim:

1. In a controlled torque coupling device for conveying motion from a first rotary part to a second rotary part co-axial to said first rotary part, in combination, a plurality of idler roller means having an outer surface forming member of resiliently compressible material and rotatably supported by one of said rotary parts and positioned about a corresponding plurality of axes evenly spaced at angular intervals about the main axis of said rotary parts and at like radial distances therefrom, so that the said plurality of axes travels along a circular path as the said one rotary part rotates, and a hollow member connected to the other of said rotary parts and including an inner surface, having a plurality of adjacent hollows therein, the said inner surface being shaped and positioned with respect to the said plurality of said idler rollers so that the latter are caused to roll along and in contact with said inner surface and to pass from any one to the adjacent one of said hollows upon radial compression of said outer surface forming member of compressible material.

2. A controlled torque coupling device as claimed in claim 1, wherein each idler roller of said plurality of idler roller means is supported for rotation about an axis parallel to the axis of said rotary parts and includes a cylindrical outer surface forming member of compressible material, wherein said idler roller means are rotatably supported between axially spaced flange portions connected to one of said rotary parts, and wherein the said hollow member including an inner surface is formed by a cup-shaped member connected to the other of said rotary parts, the said inner surface having a generally cylindrical shape and including a plurality of evenly spaced hollows, each of said hollows forming a portion of a cylindrical surface of a radius less than the radius of said generally cylindrical inner surface of said cup-shaped member.

3. A controlled torque coupling device as claimed in claim 1, wherein the said adjacent hollows have curved surfaces of a radius smaller than the radius of said inner surface in general, each two neighboring hollows of said plurality thereof having a common boundary forming a ridge transverse to the direction of rotation, the radial distance, from said main axis, of the deepest portion of said hollows differing from that of said ridges by an amount smaller than the permissible radial compression of the said outer surface forming members of the said idler roller means.

4. In a controlled torque coupling device as claimed in claim 1, each of said idler roller means including a brief shaft rotatably supported at the end portions thereof by one of said rotary parts and angularly spaced about and radially distant from the axis thereof, a tubular resiliently compressible member of rubbery material arranged about said brief shaft in the space existing between the said end portions thereof and having end faces, flange means positioned about said brief shaft respectively abutting against said end faces of said tubular member, and adjustment means in engagement with one of said end portions of said brief shaft for axially compressing the said tubular member and for thereby radially expanding the latter so as to increase the effective diameter of the particular idler roller.

5. In a controlled torque coupling device as claimed in claim 1, the number of said hollows being a multiple of the number of said idler roller means.

6. A controlled torque coupling means for conveying rotary motion from a first to a second rotary shaft, co-axial with each other, comprising, in combination: two parallel and axially spaced flange means jointly forming an end portion of one of said rotary shafts; a plurality of brief shafts, having their axes parallel with, spaced at even angular intervals about and at like radial distances from the axis of said rotary shafts, said shafts being rotatably supported at their end portions on and between said flange portions, one of the end portions of said brief shafts having a screw thread thereabout; a plurality of ball bearings mounted in said flange portions for rotatably supporting the end portions of said brief shafts, respectively; a plurality of tubular members of resiliently compressible material, having a substantially cylindrical outer surface and flat end faces mounted in the space between said end portions of said brief shafts, respectively; a plurality of movable flange members arranged near the screw threaded end portion of said brief shafts, respectively, between one of said ball bearings and one of said flat end faces; a plurality of fixed flanges connected to said brief shafts, respectively, between the other of said ball bearings and the other of said flat end faces; a plurality of nuts in engagement with said screw threaded end portion of said brief shafts, respectively, and adapted to axially compress said tubular member between said movable and fixed flanges; a hollow body co-axial with and connected to the other rotary shaft and having an inner surface positioned about and in contact with the outer substantially cylindrical surface of said plurality of tubular members; and the inner surface of said hollow member being formed with a plurality, being a multiple of the number of said brief shafts, of hollows evenly spaced from each other, each hollow being shaped as a portion of a cylinder of a radius less than the inner radius of said hollow member, adjacent hollows having a common boundary forming a ridge projecting towards the axis of said rotary shafts, the radial distance, from said axis, of the deepest portion of said hollows differing from that of said ridges by an amount smaller than the thickness of the resiliently compressible material of said tubular members.

References Cited in the file of this patent

UNITED STATES PATENTS

| | | |
|---|---|---|
| 2,326,450 | Fawick | Aug. 10, 1943 |
| 2,342,540 | Hale | Feb. 22, 1944 |
| 2,668,426 | Hoover | Feb. 9, 1954 |

FOREIGN PATENTS

| | | |
|---|---|---|
| 474,303 | Great Britain | Oct. 29, 1937 |